United States Patent
Ishikawa

(10) Patent No.: US 9,452,770 B2
(45) Date of Patent: Sep. 27, 2016

(54) STEERING WHEEL

(71) Applicant: NIHON PLAST CO., LTD., Shizuoka (JP)

(72) Inventor: Tomotaka Ishikawa, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/523,360

(22) Filed: Oct. 24, 2014

(65) Prior Publication Data
US 2015/0114168 A1 Apr. 30, 2015

(30) Foreign Application Priority Data
Oct. 28, 2013 (JP) .................................. 2013-223118

(51) Int. Cl.
| | |
|---|---|
| G05G 1/10 | (2006.01) |
| B62D 1/08 | (2006.01) |
| B62D 1/04 | (2006.01) |
| B62D 1/06 | (2006.01) |
| B29C 45/00 | (2006.01) |
| B29L 31/30 | (2006.01) |
| B29K 75/00 | (2006.01) |

(52) U.S. Cl.
CPC ............. B62D 1/04 (2013.01); B29C 45/0025 (2013.01); B62D 1/06 (2013.01); B29K 2075/00 (2013.01); B29L 2031/3047 (2013.01); Y10T 74/20834 (2015.01)

(58) Field of Classification Search
CPC ............ B62D 1/04; B62D 1/06; B62D 1/11; B62D 1/08; B29C 45/0025; B29L 2031/3047; Y10T 74/20876; Y10T 74/20834
See application file for complete search history.

(56) References Cited

U.S. PATENT DOCUMENTS

| | | | | |
|---|---|---|---|---|
| 5,070,742 A | * | 12/1991 | Sakane | B62D 1/04 74/552 |
| 6,238,506 B1 | * | 5/2001 | Satoh | B62D 1/04 156/169 |
| 6,412,365 B1 | * | 7/2002 | Nagata | B62D 1/06 74/558 |
| 6,453,769 B2 | * | 9/2002 | Sakurai | B60Q 1/0082 74/552 |
| 6,622,590 B2 | * | 9/2003 | Sugiyama | B62D 1/04 74/552 |
| 8,661,936 B2 | * | 3/2014 | Vigeant | B60R 21/05 280/728.2 |
| 2005/0217413 A1 | * | 10/2005 | Specht | B62D 1/04 74/552 |

FOREIGN PATENT DOCUMENTS

| | | | | |
|---|---|---|---|---|
| EP | 0262355 A1 | * | 4/1988 | ............... B62D 1/04 |
| JP | 2013-95224 A | | 5/2013 | |

OTHER PUBLICATIONS

Machine translation of EP 0262355 A1 obtained on Oct. 15, 2015.*

* cited by examiner

*Primary Examiner* — Adam D Rogers
(74) *Attorney, Agent, or Firm* — Arent Fox LLP

(57) ABSTRACT

A steering wheel of the present invention is provided with: a spoke cored bar portion configured to couple a boss cored bar portion and a rim cored bar portion to each other. At least a surface of a respective one of the rim cored bar portion and the spoke cored bar portion is covered with a synthetic resin. An inclined longitudinal wall portion is coupled to the spoke cored bar portion at a connection portion, and at an intermediate part of the connection portion, an easily deformable portion is formed. In this manner, it is possible to provide a steering wheel which is not degraded in appearance quality, even if a rib for preventing shrinkage of a resin is increased in size, the steering wheel having an excellent dynamic performance thereof.

4 Claims, 13 Drawing Sheets

STEERING WHEEL

CROSS REFERENCE TO RELATED APPLICATIONS

This application claims priority of Japanese Patent Application No. 2013-223118 filed on Oct. 28, 2013. The contents of this application are incorporated herein by reference in their entirety.

BACKGROUND OF THE INVENTION

1. Field of the Invention

The present invention relates to a steering wheel in which a rim cored bar portion, a hub cored bar portion, and a spoke cored bar portion are covered with urethane.

2. Description of the Related Art

In so far as a steering wheel of a motor vehicle is concerned, its related cored bar portions having an aluminum alloy, a magnesium alloy or the like casted therein are covered with a synthetic resin to thereby form external shapes (which are also referred to as volumes) of a rim portion and a spoke portion.

That is, the steering wheel has: a rim in which a rim cored bar portion formed in a shape of a circular ring is covered with urethane serving as a synthetic resin, and which is gripped by a driver; a hub in which a hub cored bar portion disposed at a center part in a radial direction of the rim is covered with urethane; and a spoke in which at least one spoke cored bar portion configured to couple the hub cored bar portion and the rim cored bar portion to each other in a radial direction is covered with urethane. At the time of covering the cored bar portions with urethane, there is a need to provide a core material inside of a portion with a predetermined degree of volume. This provision is indispensable to ensure strength of molded articles or to take an appropriate countermeasure against shrinkage or the like. It is to be noted that, in so far as a resin configured to cover the cored bar portion is concerned, in a case where the resin is of such a type that a hard resin such as polypropylene is employed, there is a problem that its related surface hardness is great and its related touch sense is poor when the rim portion is gripped.

On the other hand, in so far as a resin of such a type that the cored bar portion is covered with urethane is concerned, an appropriate softness in touch sense can be imparted.

However, urethane itself is a resin having a low strength thereof; and therefore, inside of the resin, a cored bar portion made of a metal or the like having a high rigidity thereof needs to be disposed over its related detailed parts. It is to be noted that, if urethane is molded at a portion at which the cored bar portion is not provided, the strength of urethane with respect to an external force cannot be guaranteed.

Here, in a conventional steering wheel, a spoke is of such a type that a comparatively small amount of urethane is employed.

Now, with reference to FIG. 12 (*a*), there is shown a case in which a rib for preventing shrinkage of a resin is not provided at an inclined coupling portion 13*aa* which is a part of a spoke cored bar portion 12*a* of a steering cored bar portion 10*a*. Also, with referring to the figure, there is illustrated a case in which, in so far as urethane serving as a resin configured to cover the steering cored bar 10*a* is concerned, even if there is not provided a rib which is small in amount of urethane configured to cover the spoke cored bar portion 12*a*, and which is for preventing the shrinkage of urethane, the appearance quality of urethane meets a predetermined criterion (reference should be made to Japanese Unexamined Patent Application Publication No. 2013-95224, for example). It is to be noted that reference numeral 11*a* in the figure designates a rim cored bar portion.

The steering wheel that is described in Japanese Unexamined Patent Application Publication No. 2013-95224 is characterized as the one having a large thickness portion which is thick at a center portion configured to engage with a steering shaft of a hub cored bar portion and a small thickness portion which is gradually smaller in thickness as the steering wheel goes to an end part thereof.

In another conventional steering wheel, a spoke is of such a type that a comparatively large amount of urethane is employed.

Now, with reference to FIG. 13, there is shown a case in which a rib 24 for preventing the shrinkage of urethane is provided at an inclined coupling portion 23*aa* of a steering cored bar 20*a*. Also, with reference to the figure, there is shown a case in which in urethane configured to cover the steering cored bar 20*a*, a large amount of urethane is employed as a covering material of a spoke 22, and there is a need to provide a rib 24 for preventing the shrinkage of urethane. In addition, there is shown a case in which such a rib 24 is formed in the inclined coupling portion 23*aa* of the steering cored bar 20*a*, whereby the appearance quality and the dynamic performance of urethane meet a predetermined criterion.

Hereinafter, the dynamic performance of a steering wheel will be described.

The performance of the steering wheel is characterized by having a function of enabling a rib and a spoke cored bar portion to be deformed to an extent such that the rim and the spoke cored bar portion are not separated from each other in a case where a predetermined external pressure is applied to the steering wheel.

In an impact test, it is required that the spoke cored bar portion bends by some tens of millimeters without a breakage of a rim cored bar portion or a hub cored bar portion of a steering coed bar, or alternatively, that a rib is not separated from an inclined coupling portion of the spoke cored bar portion.

In so far as the steering cored bar 20*a* shown in FIG. 13 is concerned, a load is applied in a direction which is inclined with respect to a steering rotary shaft, whereby a rim portion is deformed significantly to a lower side with respect to a hub cored bar portion 23*a* in a region which is indicated by the dashed line L5 to thereby able to suppress generation of an excessive resistance force.

In the meanwhile, in recent years, there has been a tendency that a variety of switches or members are provided in a steering wheel, or alternatively, a thickness of urethane is increased in order to produce a high grade sense.

If the thickness of urethane is increased, the amount of shrinkage at the time of execution of a urethane covering process is increased, accordingly. Thus, an increased size of a rib is taken into an account.

However, if the rib is increased in size, although the shrinkage associated with an increased quantity of urethane is prevented, there is an apprehension that a predetermined criterion cannot be met in an inclined load characteristic or in a flat push test.

In addition, if the molding requirement mentioned above (in other words, a requirement that a cored bar portion is formed inside of a resin) is merely applied to the steering wheel, the following problem occurs.

A spoke portion is inclined with respect to a vertical direction (an axial direction) of a rim portion and a boss portion and thus an inclined coupling portion which is formed at a cored bar portion is obtained as a portion of which a rigidity is increased with respect to a load acting on the steering wheel, and its related resistance force becomes excessive.

SUMMARY OF THE INVENTION

It is an object of the present invention to provide a steering wheel which is not degraded in appearance quality, even if a rib for preventing shrinkage of a resin is increased in size, the steering wheel having an excellent dynamic performance thereof.

In order to solve the problem described above, according to one aspect of the present invention, there is provided a steering wheel comprising: a boss cored bar portion; a rim cored bar portion; and a spoke cored bar portion configured to couple the boss cored bar portion and the rim cored bar portion to each other, at least a surface of a respective one of the rim cored bar portion and the spoke cored bar portion being covered with a synthetic resin, wherein an inclined longitudinal wall portion is coupled to the spoke cored bar portion at a connection portion, and an easily deformable portion is formed at an intermediate part of the connection portion.

According to such one aspect of the present invention, it is feasible to provide a steering wheel which is not degraded in appearance quality, even if a rib for preventing shrinkage of the resin is increased in size, the steering wheel having an excellent dynamic performance thereof.

BRIEF DESCRIPTION OF THE DRAWINGS

FIG. 2 (b) is a sectional view of a hub 33; and FIG. 2 (c) is a sectional view taken along the line IIc-IIc of FIG. 2 (b);

FIG. 6 (b) is a sectional view taken along the line VIb-VIb of FIG. 5; and FIG. 6 (c) is a sectional view taken along the line VIc-VIc of FIG. 5;

FIG. 7 (b) is a sectional view taken along the line VIIb-VIIb of FIG. 7 (a);

FIG. 8 (b) is an enlarged view of FIG. 8 (a); FIG. 9 (b) is an enlarged view of FIG. 9 (a);

FIG. 10 (b) is an enlarged view of FIG. 10 (a);

FIG. 11 (b) is a sectional view taken along the line XIId-XIId of FIG. 11 (a);

FIG. 12 (b) is a partially enlarged perspective view of an ellipse L2 which is indicated by the dashed line of FIG. 12 (a)

DESCRIPTION OF THE PREFERRED EMBODIMENTS

First Embodiment

Figure 1:
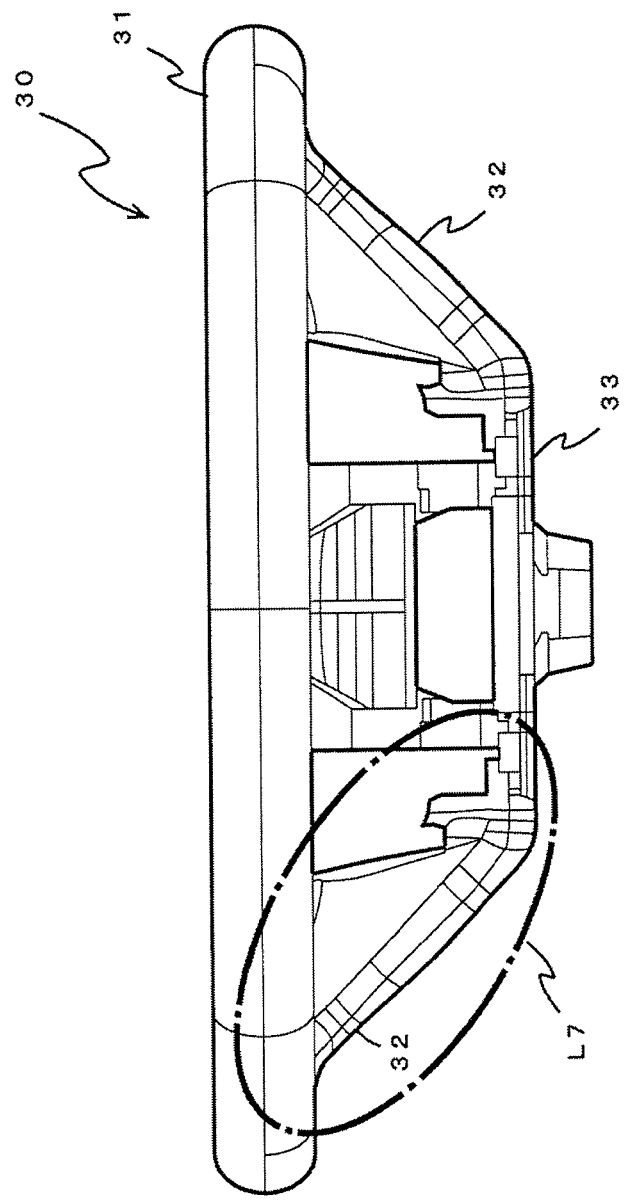
FIG. 1 is a side view showing an embodiment of a steering wheel.

A steering wheel 30 shown in FIG. 1 has a spoke 32 which is larger in thickness than that of a conventional steering wheel. It is to be noted that reference numeral 33 in the figure designates a hub and reference numeral 31 in the figure designates a rim.

Figure 2:
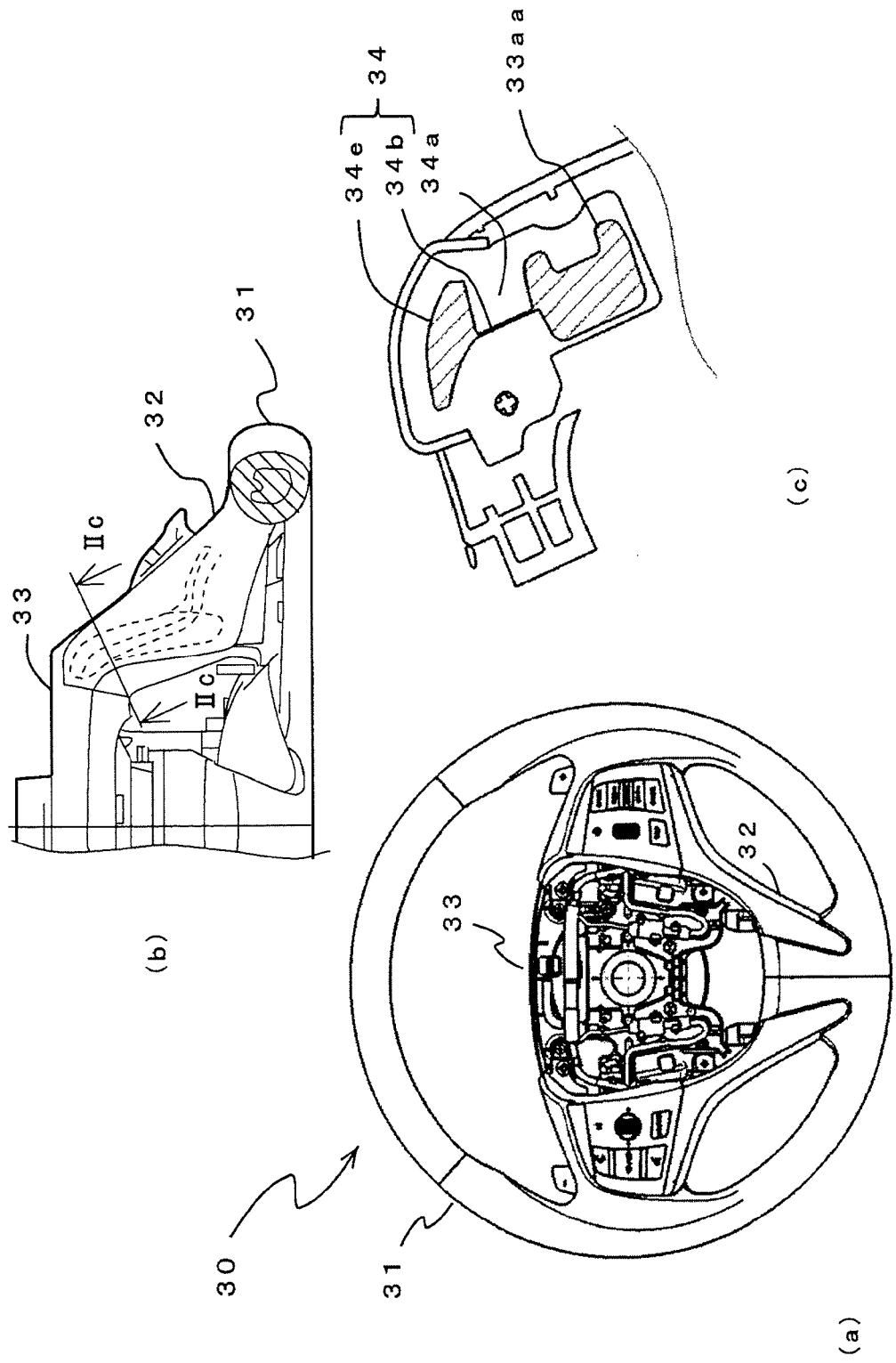
FIG. 2 (a) is a plan view showing a state in which an airbag device of a steering wheel 30 shown in FIG. 1 is removed.

Referring to FIG. 2, it is found that a rib 34 is provided in an inclined coupling portion 33aa of a spoke cored bar portion of the steering wheel 30. The rib 34 has a connection portion 34b and an inclined longitudinal wall portion 34e, and a groove 34a is formed between the inclined longitudinal wall portion 34e and the inclined coupling portion 33aa. By way of this groove 34a, the connection portion 34b is obtained as a small thickness portion.

In so far as the steering wheel 30 is concerned, a rib 34 for preventing shrinkage is set in its required range in terms of appearance, and a small thickness portion 34b of the rib 34 is set in an inclined coupling portion 33a which is desired to be bendable in its own performance to thereby able to suppress the shrinkage of urethane and achieve its related performance.

Figure 3:
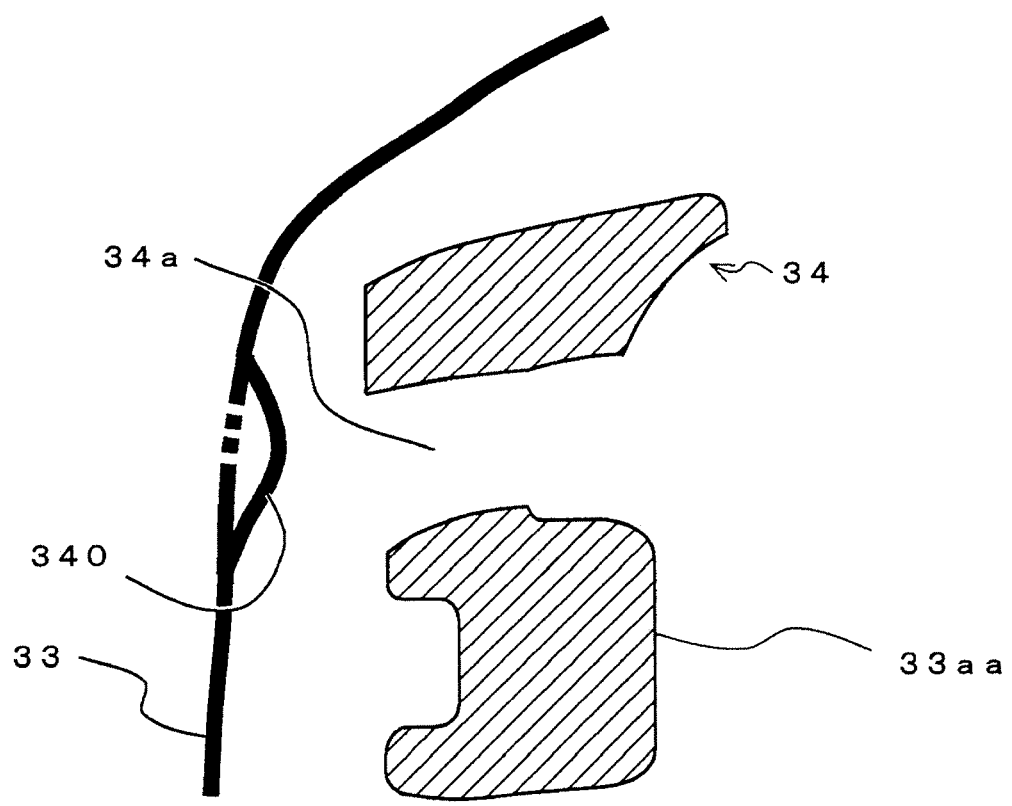
FIG. 3 is an enlarged sectional view of a rib and its proximity.

Here, if the small thickness portion 34b is not formed in the rib 34, urethane of the hub 33 shrinks as shown in FIG. 3, and there occurs so called shrinkage which is exerted by molding and shrinking of urethane on a shape forming surface. It is to be noted that reference numeral 340 in the figure designates a step difference.

Now, with reference to FIG. 4 to FIG. 7, a detailed description will be given with respect to the rib 34.

Figure 4:
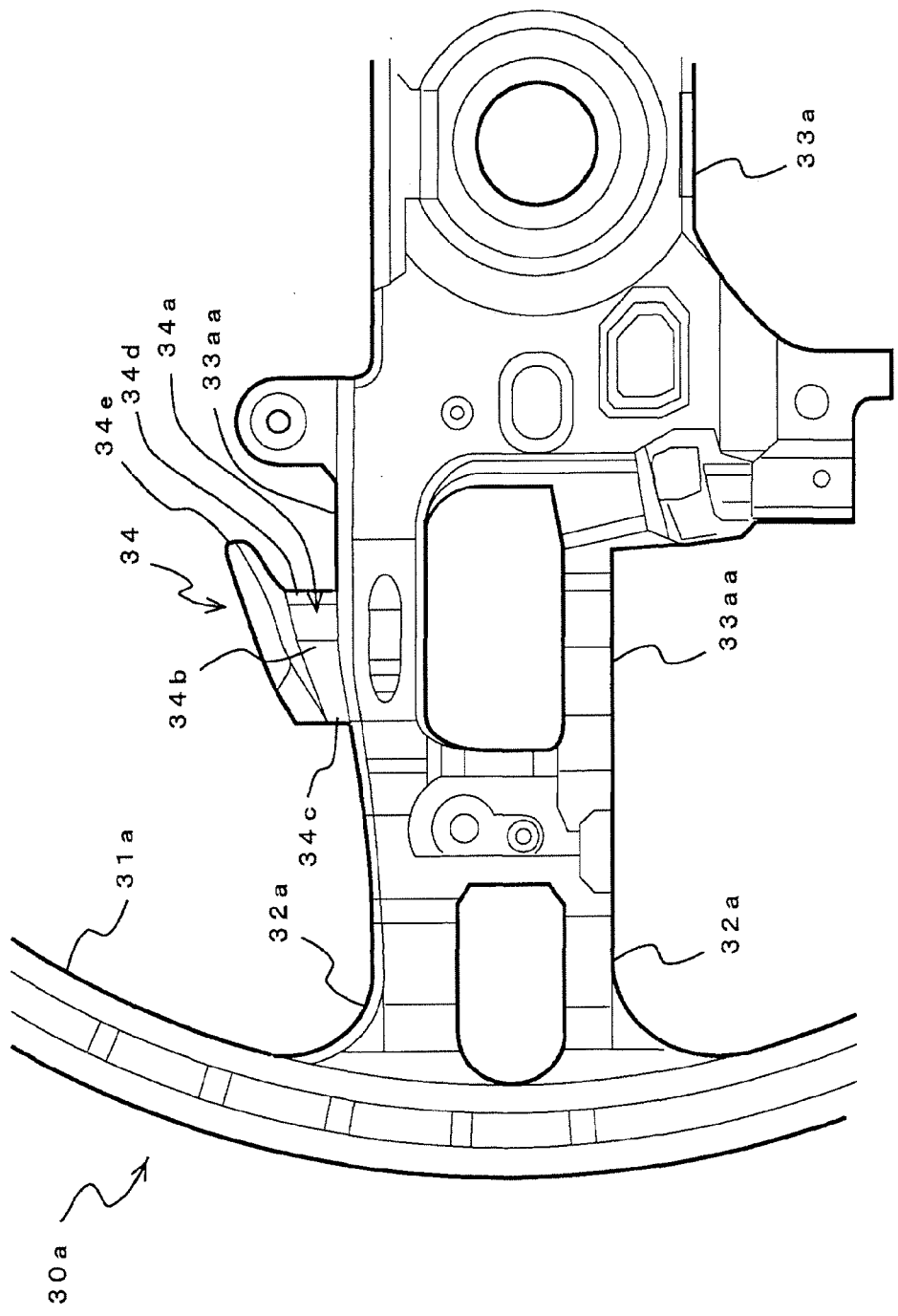
FIG. 4 is a partially enlarged back view showing a region from a hub cored bar portion 33a to a rim cored bar portion 31a of the steering wheel 30 shown in FIG. 1.

The rib 34 is formed in the inclined coupling portion 33aa of the spoke cored bar portion 32a shown in FIG. 4. On a back side of the rib 34, a groove 34a is formed in such a manner as to form a small thickness portion serving as an easily deformable portion.

The steering wheel cored bar 30a shown in FIG. 4 has: a rim cored bar portion 31a formed in a shape of a ring; a hub cored bar portion 33a (boss cored bar portion); and a spoke cored bar portion 32a configured to couple the rim cored bar portion 31a and the hub cored bar portion 33a to each other. The rib 34 is formed on one side of the inclined coupling portion 33aa of the spoke cored bar portion 32a (on an upper side in the figure).

As shown in FIG. 4, although an inclined longitudinal wall portion 34e of the rib 34 is formed in a peaked shape which expands from the rim cored bar portion to the hub 33a, this is because such a peaked shape corresponds to an external shape of urethane configured to cover the steering wheel cored bar portion 30a, and there may be formed in any shape as long as it is possible to prevent the shrinkage of urethane, without being limited to the external shape illustrated.

Figure 5:
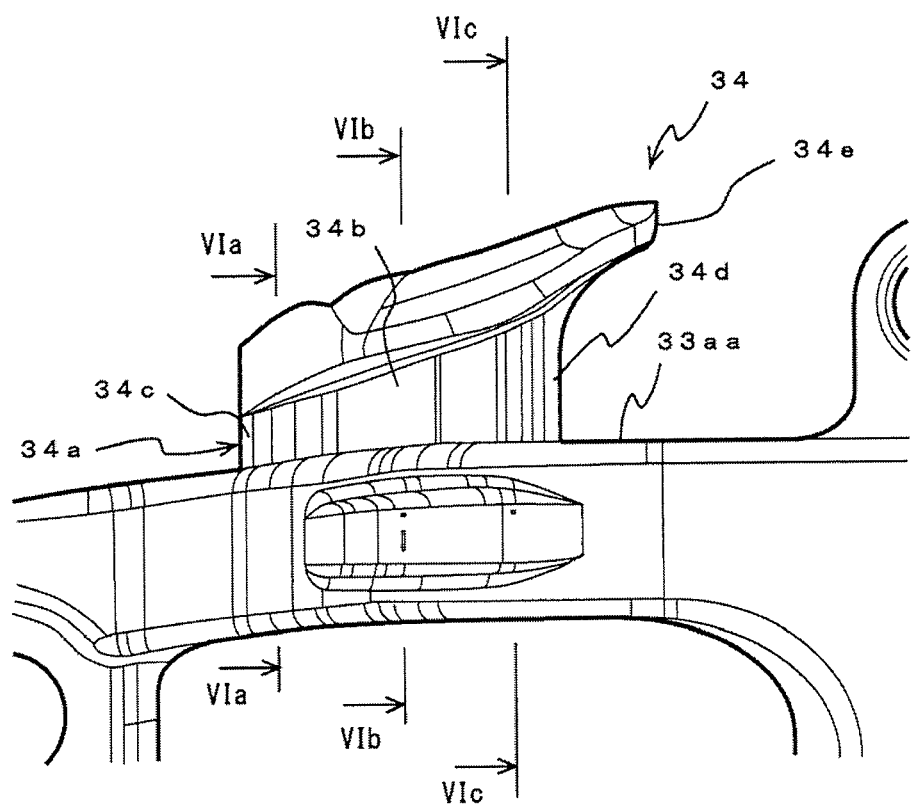
FIG. 5 is a partially enlarged back view of a rib and its proximity employed in the steering wheel 30 shown in FIG. 4.
Figure 6:
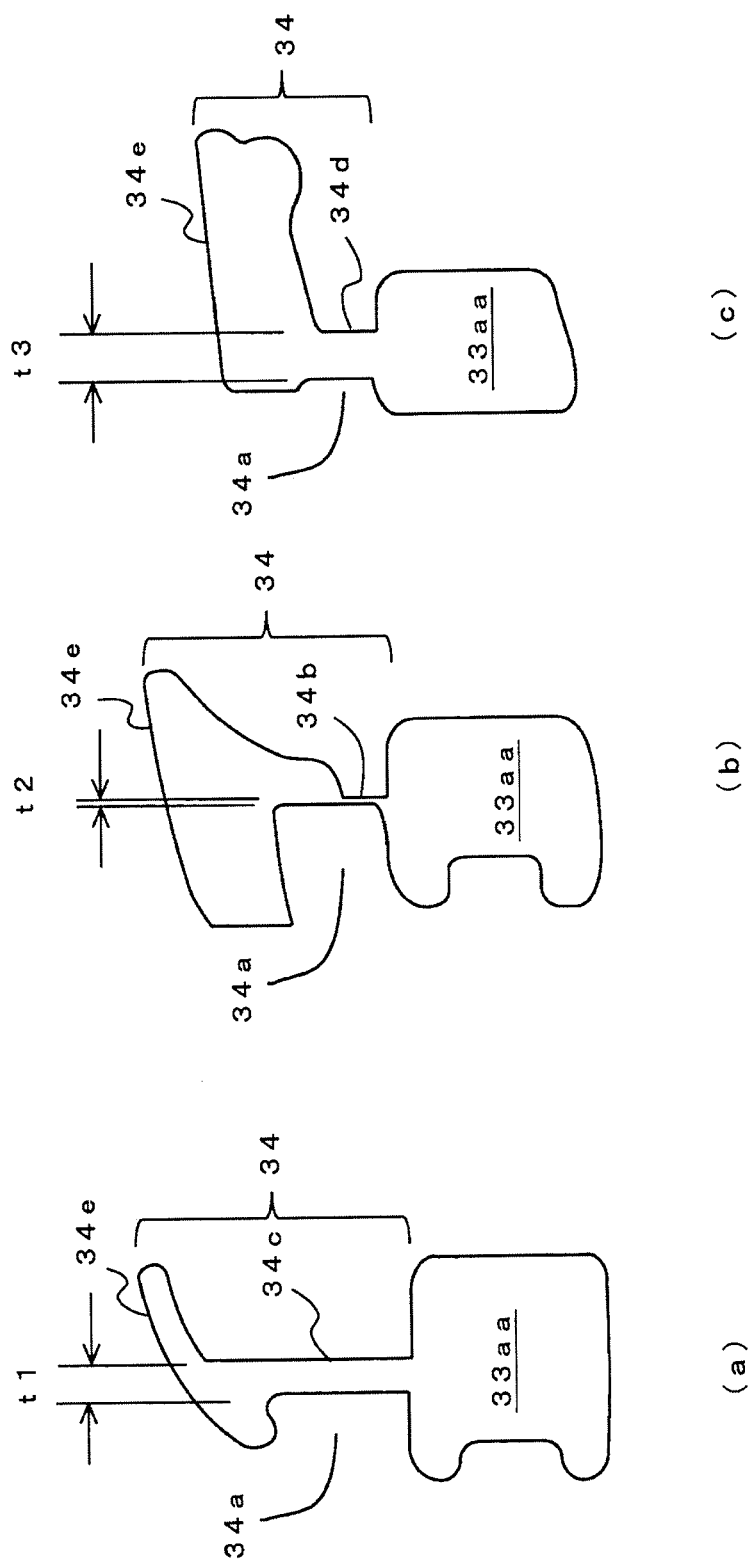
FIG. 6 (a) is a sectional view taken along the line VIa-VIa of FIG. 5.

In so far as the hub 34 is concerned, as shown in FIG. 5 and FIG. 6, a connection portion 34b at a center thereof is formed so as to be thin (so as to be a small thickness portion), and lateral connection portions 34c, 34d each are formed so as to be larger in thickness than the connection portion 34b at the center (so as to be a large thickness portion). These connection portions 34b to 34d each are formed by a groove 34a between the inclined longitudinal wall portion 34e and the inclined coupling portion 33aa.

A thickness t1 of the connection portion (large thickness portion) 34c shown in FIG. 6 (a) to FIG. 6 (c) is 2.3 mm, for example; a thickness t2 of the connection portion (small thickness portion) 34b is 0.4 mm, for example; and a thickness t3 of the connection portion (large thickness portion) 34d is 3 mm, for example. Plate thicknesses t1, t3 of the connection portions (large thickness portions) 34c, 34d each are set so as to be an ordinary plate thickness with respect to the spoke cored bar portion 32a. If an impact load is applied to the steering wheel, the spoke cored bar becomes easily bendable while the connection portion of 0.4 mm in thickness (hereinafter, referred to as a small thickness portion) 34b is defined as a start point of deformation, and a deformation stroke can be ensured and thus an increase in resistance force exerted by bottoming can be restrained.

Figure 7:
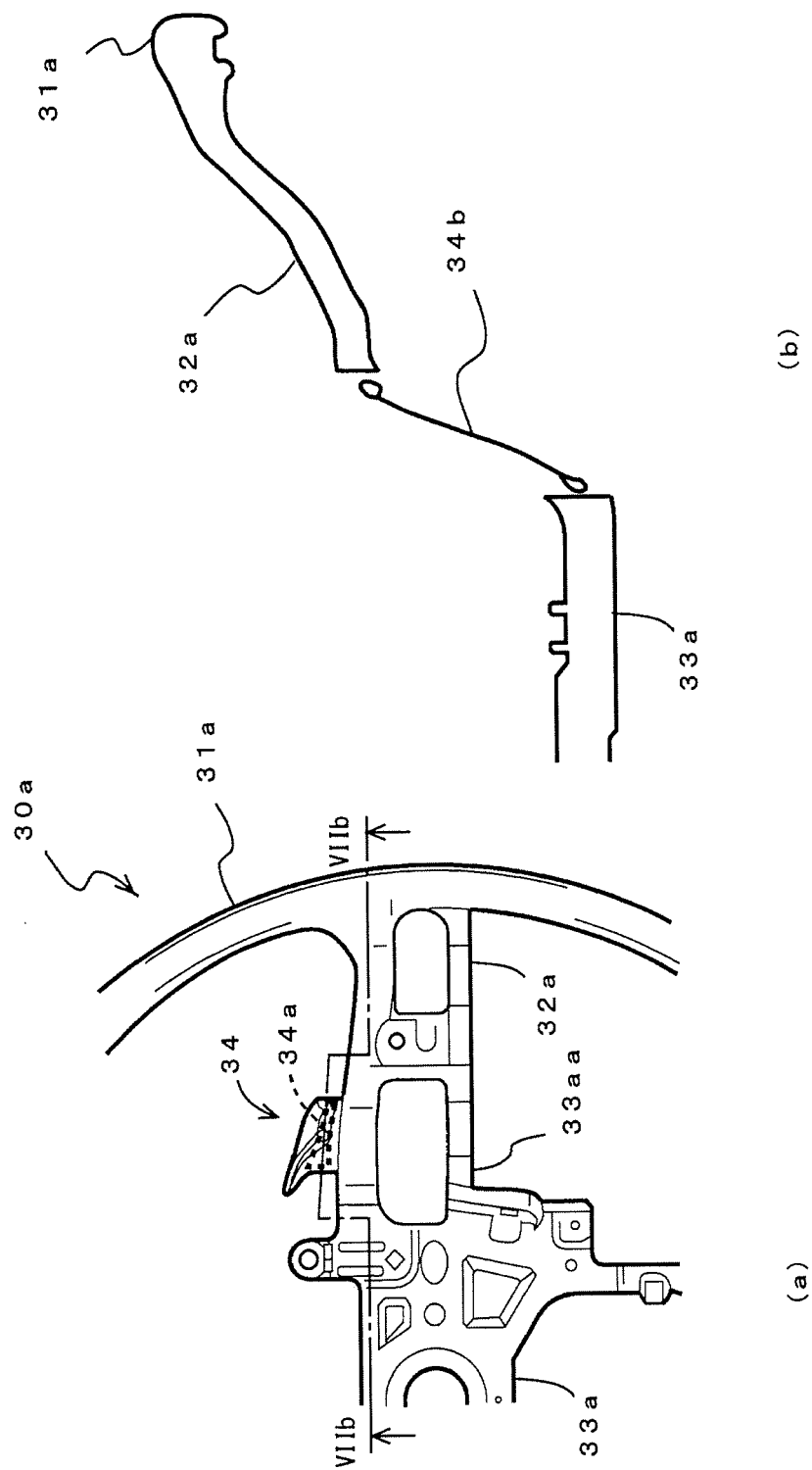
FIG. 7 (a) is a partial plan view of a steering cored bar 30a of the steering wheel shown in FIG. 1.

It is found that the small thickness portion 34b shown in FIG. 7 (b) is formed in a uniform thickness. By employing such a construction, even if a rib for preventing shrinkage of a resin is increased in size, an appearance quality is not degraded, and an appropriate dynamic performance can be obtained. In addition, if an external pressure is applied to the steering wheel, a rib is deformed, a deformation stroke of a spoke portion is ensured, and generation of an excessive resistance force can be restrained.

In addition, although so called shrinkage occurs with urethane, its related intermediate part shrinks uniformly; and therefore, shading off can be carried out, and its related appearance quality is improved.

Second Embodiment

Figure 8:
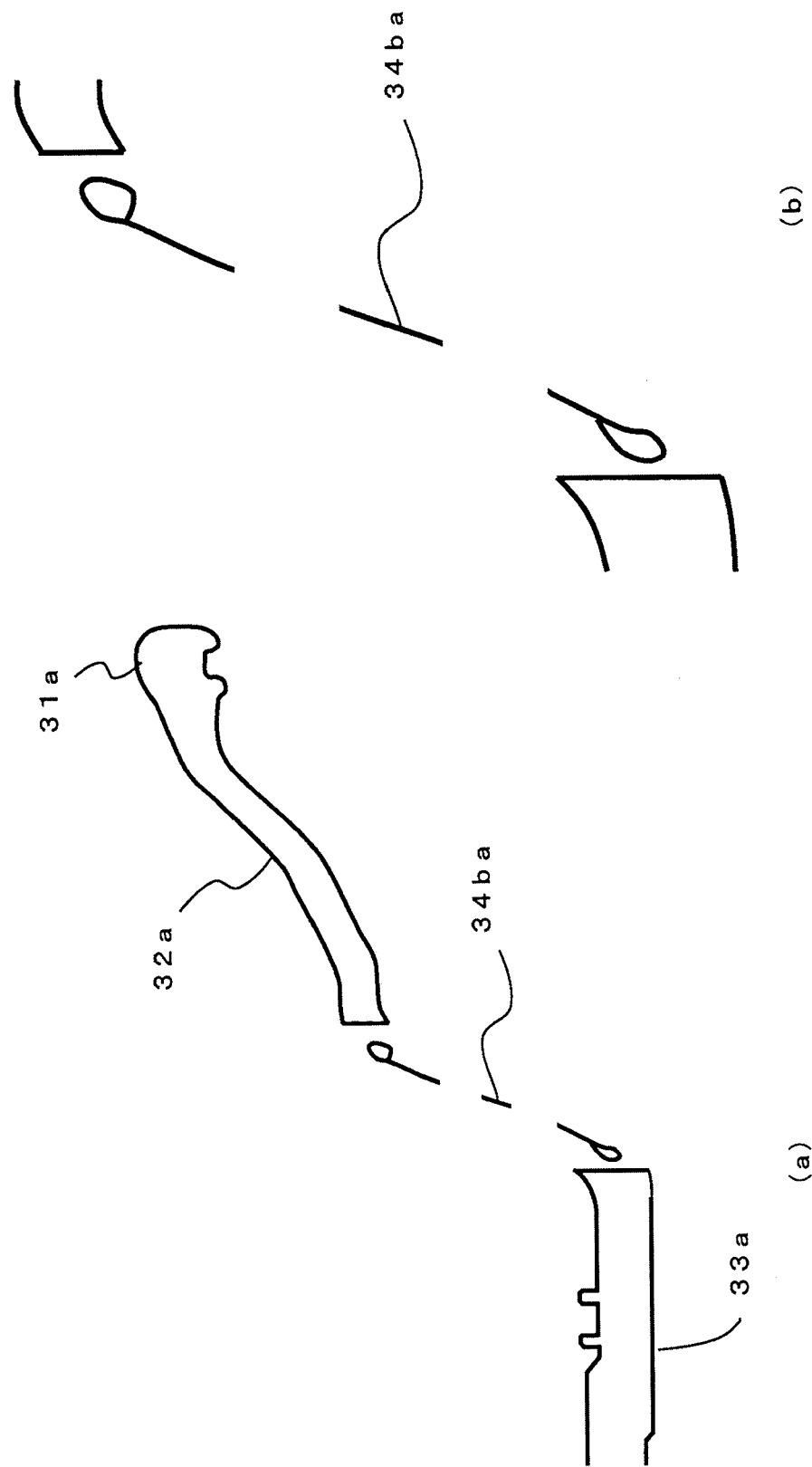
FIG. 8 (a) is a partial plan view showing another embodiment of the steering cored bar 30a of the steering wheel shown in FIG. 1.

As shown in FIG. 8 (a) and FIG. 8 (b), a small thickness portion 34ba has a thickness which is identical to that of the small thickness portion 34b shown in FIG. 7 (b), and a plurality of through holes are formed. That is, a portion at which the groove 34a of the rib 34 is formed has a predetermined thickness, and a plurality of through holes are formed. In this manner, the shrinkage in the urethane covering process is restrained, and its related performance can be achieved.

Third Embodiment

Figure 9:
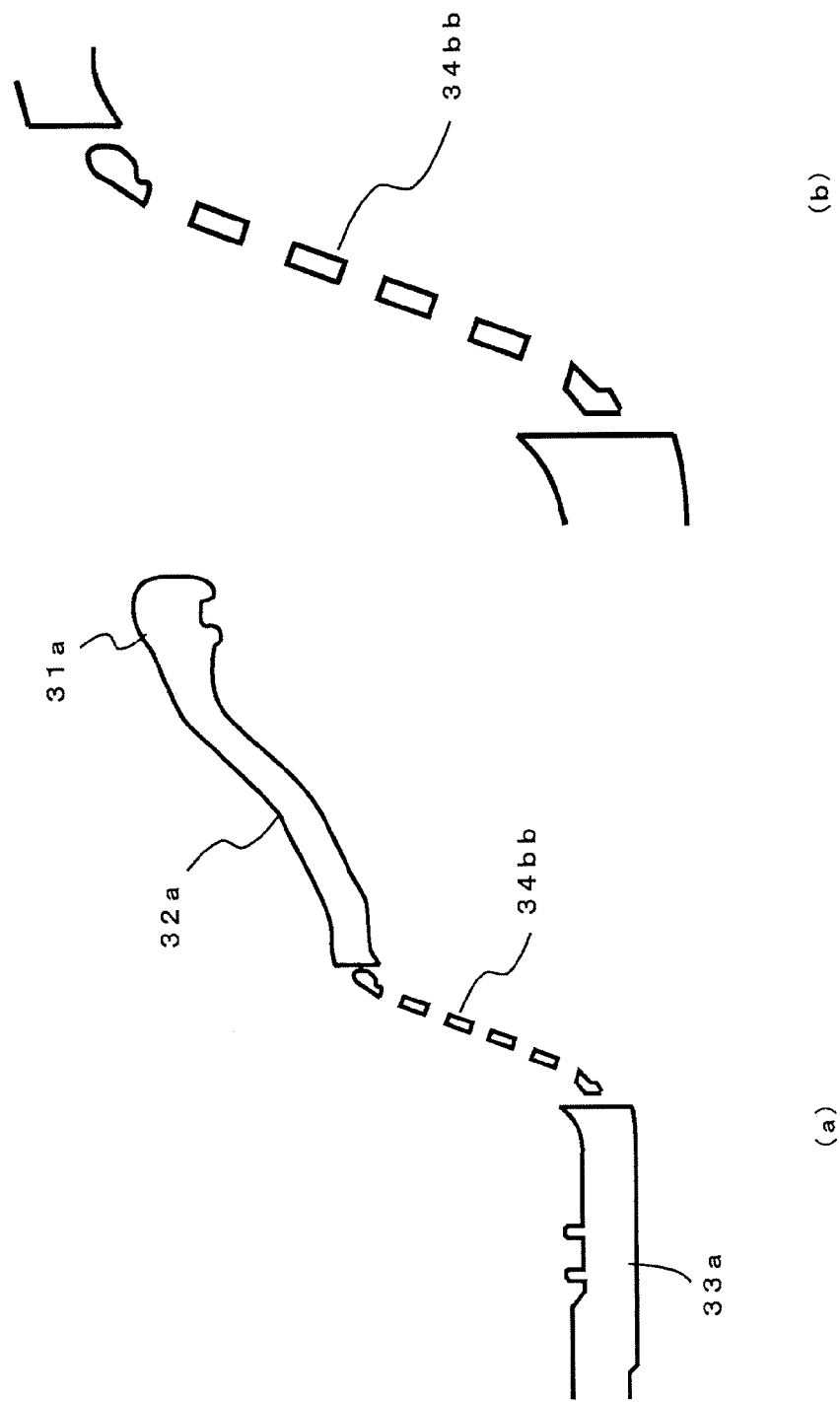
FIG. 9 (a) is a partial plan view showing another embodiment of the steering cored bar 30a of the steering wheel shown in FIG. 1.

As shown in FIG. 9 (a) and FIG. 9 (b), a small thickness portion 34bb is larger in thickness than the small thickness portion 34b (FIG. 7 (b)), and a number of through holes are formed. As used herein, the term "a number of designates more than through holes formed in the small thickness portion 34b shown in FIG. 8 (a) and FIG. 8 (b). In addition, a diameter of the though hole shown in FIG. 9 (a) and FIG. 9 (b) is smaller than a diameter of the through hole shown in FIG. 8 (a) and FIG. 8 (b).

Thus, even in a case where the thickness of the small thickness portion 34ba is increased so as to be larger than that of the small thickness portion 34b (FIG. 7 (b)), the shrinkage in the urethane covering process is restrained, and its related performance can be achieved.

Fourth Embodiment

Figure 10:
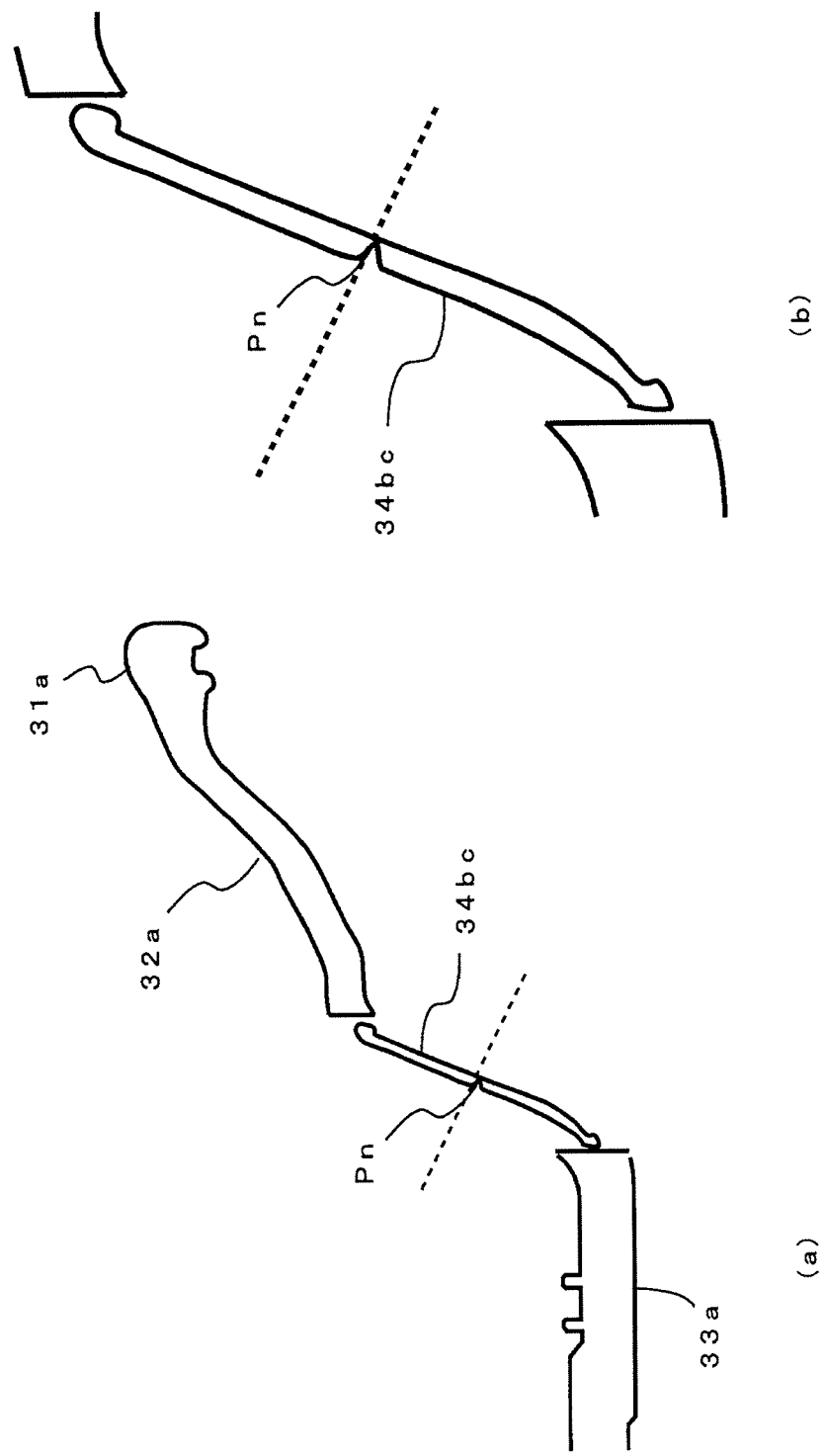
FIG. 10 (a) is a partial plan view showing another embodiment of the steering cored bar 30a of the steering wheel shown in FIG. 1.

As shown in FIG. 10 (a) and FIG. 10 (b), a small thickness portion 34bc is larger in thickness than the small thickness portion 34b (FIG. 6 (b)), and a bending point (notch) Pn is set on one site.

Thus, even if the small thickness portion 34bc is larger in thickness than the small thickness portion 34b (FIG. 7 (b)), the bending point (notch) Pn is set on one site, whereby the shrinkage in the urethane covering process is restrained, and its related performance can be achieved.

Figure 11:
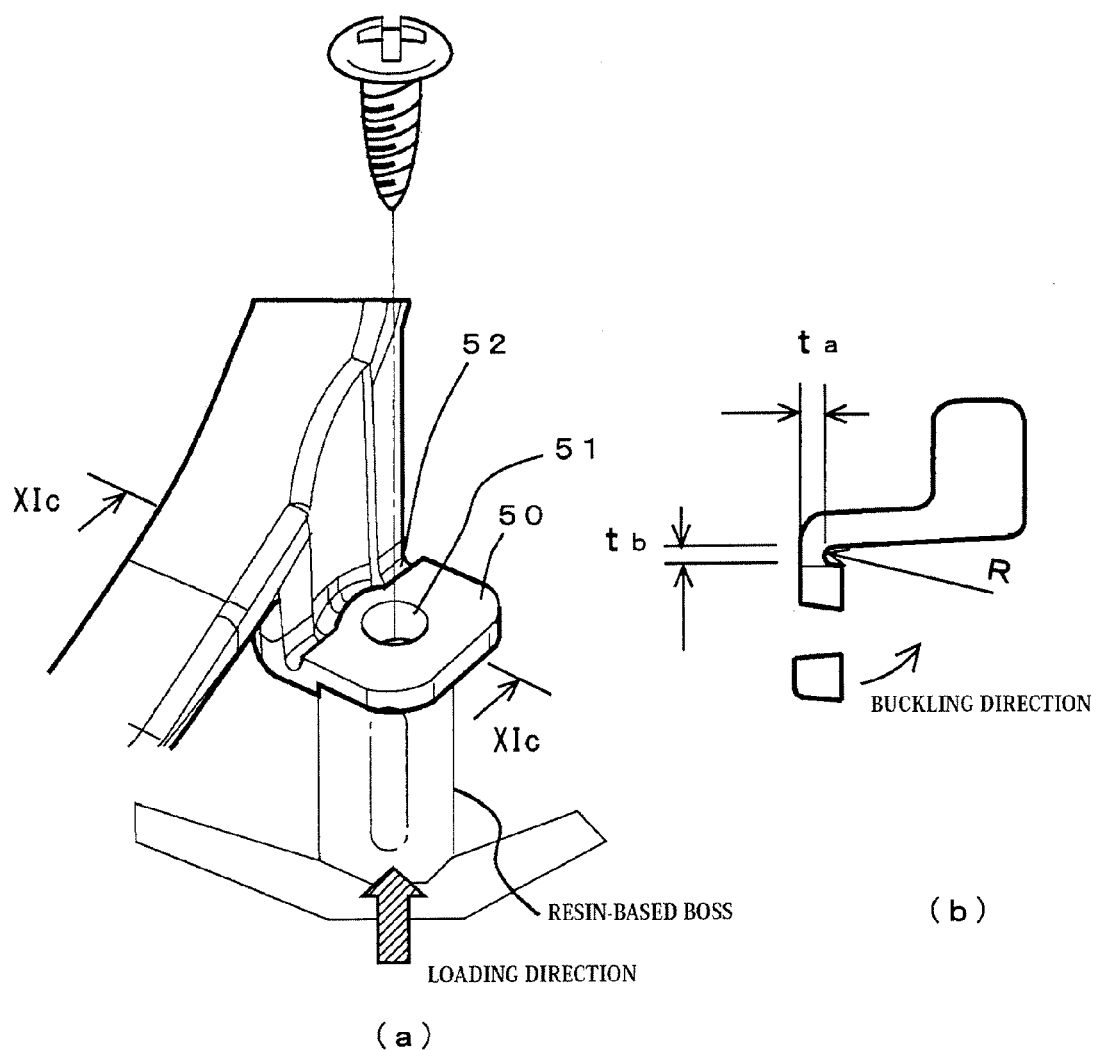
FIG. 11 (a) is a view showing a base for resin-based boss.
Figure 12:
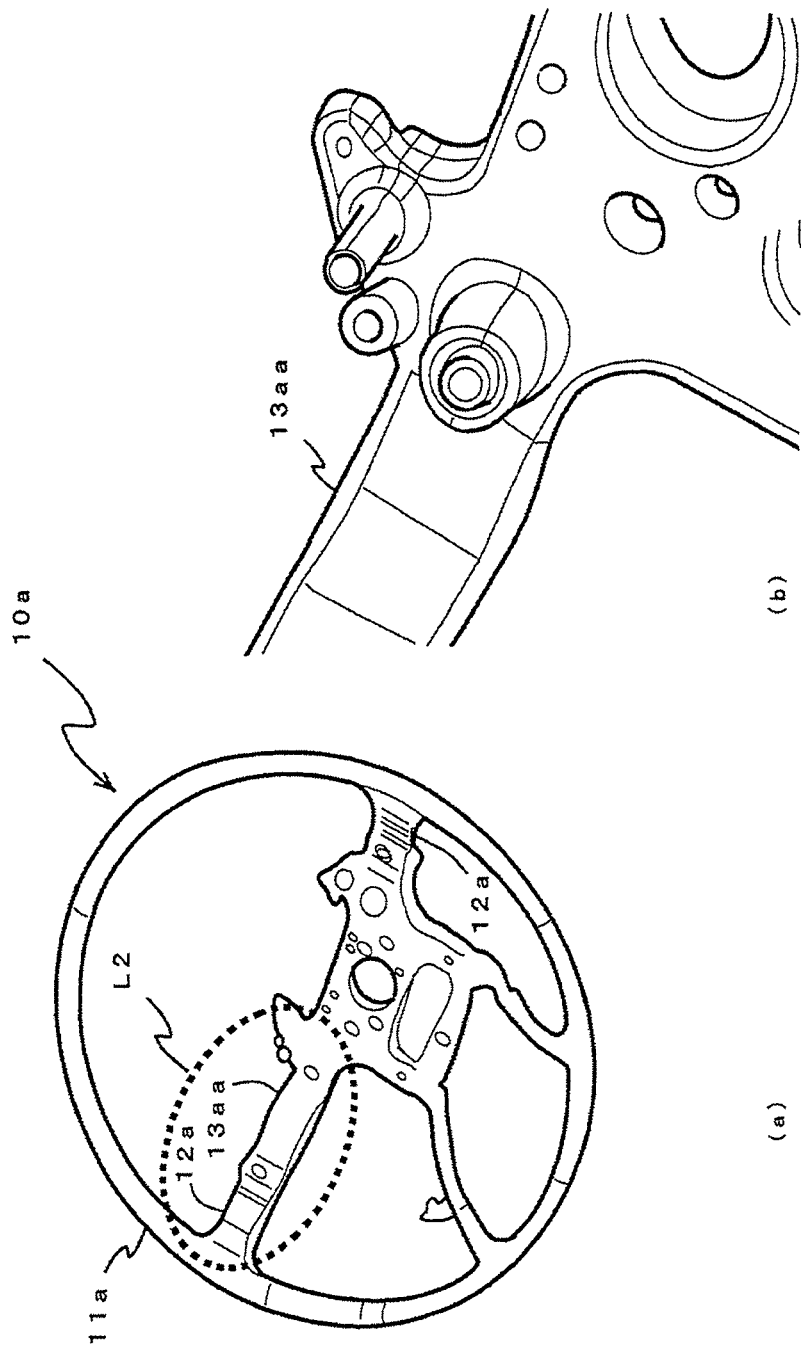
FIG. 12 (a) is a perspective view of an appearance of a steering cored bar 10a which is employed in a conventional steering wheel.
Figure 13:
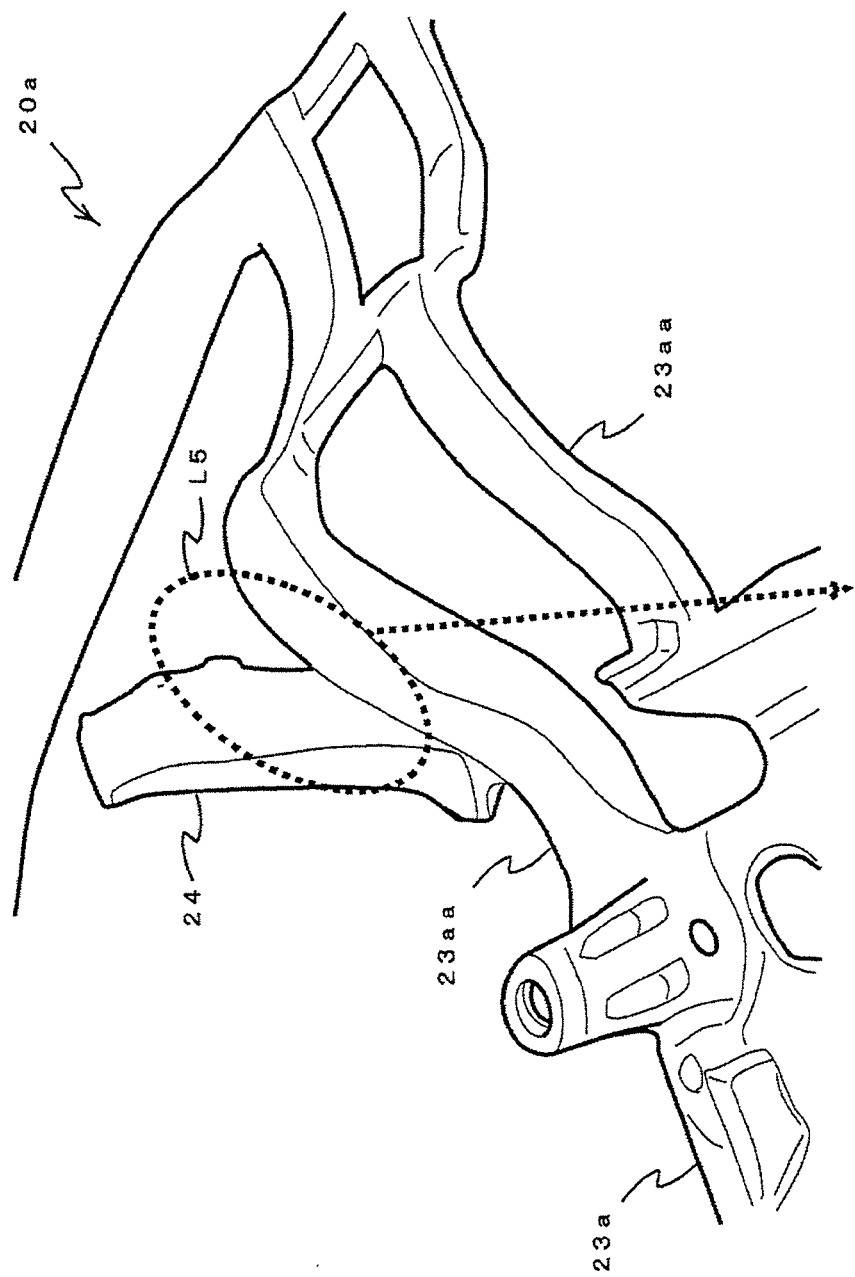
FIG. 13 is a perspective view of an appearance showing a test state of an inclined load characteristic of a steering cored bar portion.

In so far as the steering wheel is concerned, a resin-based cover member is mounted on a face which is opposed to an occupant side of a steering cored bar. In general, screw tightening is carried out with respect to a resin-based boss which is formed in the resin-based cover member on a base formed in a cored bar. A groove 52 as shown in FIG. 11 (a) and FIG. 11 (b) is formed in the base (50), whereby, when a load is applied, the base becomes easily bendable. It is to be noted that reference numeral 51 in the figure designates a screw hole.

Although a sectional shape of the groove 52 is a semicircular shape on the order of 1 mm in radius R, the present invention is not limited thereto, and a V-shape or a U-shape may be formed. Also, although a thickness "ta" between the base and a member is on the order of 2 mm and a thickness "tb" is on the order of 1 mm, the present invention is not limited thereto. Thus, a groove is formed at a boundary portion between the base and the member, whereby, even if a predetermined external pressure (load) is applied, bending can be carried out to an extent such that the base and the member are not separated from each other.

As described above, it is feasible to provide a steering wheel which is not degraded in appearance quality, even if a rib for preventing the shrinkage of the resin is increased in size, the steering wheel having a dynamic performance thereof. In addition, according to the embodiment and its related modification example, even if an external pressure is applied to the steering wheel, a rib is deformed, a deformation stroke of a spoke portion is ensured, and generation of an excessive resistance force can be restrained.

It is to be noted that the foregoing embodiments each show an example of the preferred embodiments of the present invention, the present invention is not limited thereto, and a variety of modifications can occur without departing from the scope and spirit of the present invention. For example, although the foregoing embodiments each have described a case in which the number of spokes is three, the present invention is not limited thereto.

What is claimed is:
1. A steering wheel comprising:
a boss cored bar portion;
a rim cored bar portion; and
a spoke cored bar portion configured to couple the boss cored bar portion and the rim cored bar portion to each other, at least a surface of a respective one of the rim cored bar portion and the spoke cored bar portion being covered with a synthetic resin,
wherein an inclined wall portion is coupled to a connection portion which connects directly to the spoke cored bar portion, the inclined wall portion extending longitudinally along the spoke cored bar portion,
wherein the connection part has a plurality of parts arranged in a longitudinal direction, a thickness of the connection portion being at a minimum at an intermediate part among the plurality of parts, and wherein the connection portion has a groove thereon which determines the thickness of the connection portion at each of the plurality of parts.

2. The steering wheel according to claim 1, wherein the thickness of the connection portion at the intermediate part may be deformed by an external pressure is applied in a direction substantially parallel to the spoke cored bar portion.

3. The steering wheel according to claim 1, wherein the intermediate part comprises a plurality of through holes.

4. The steering wheel according to claim 1, wherein a notch is formed in the intermediate part.

* * * * *